United States Patent
Sennoun et al.

(10) Patent No.: US 10,624,095 B2
(45) Date of Patent: Apr. 14, 2020

(54) METHOD FOR MANAGING ALLOCATION OF CARRIER FREQUENCIES

(71) Applicant: SAGEMCOM ENERGY & TELECOM SAS, Rueil Malmaison (FR)

(72) Inventors: Yassir Sennoun, Rueil Malmaison (FR); Franck Harnay, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/089,611

(22) PCT Filed: Mar. 28, 2017

(86) PCT No.: PCT/EP2017/057297
§ 371 (c)(1),
(2) Date: Sep. 28, 2018

(87) PCT Pub. No.: WO2017/167740
PCT Pub. Date: Oct. 5, 2017

(65) Prior Publication Data
US 2019/0116593 A1 Apr. 18, 2019

(30) Foreign Application Priority Data
Mar. 29, 2016 (FR) .................................... 16 52689

(51) Int. Cl.
*H04W 72/04* (2009.01)
*H04W 72/08* (2009.01)

(52) U.S. Cl.
CPC ..... *H04W 72/0453* (2013.01); *H04W 72/085* (2013.01); *H04W 72/08* (2013.01)

(58) Field of Classification Search
CPC .......... H04W 72/0453; H04W 72/085; H04W 72/08
See application file for complete search history.

(56) References Cited

U.S. PATENT DOCUMENTS

2005/0204167 A1* 9/2005 Conlin ............... G07C 9/00007
726/5
2009/0170440 A1* 7/2009 Eyuboglu ............. H04W 36/06
455/63.3

(Continued)

FOREIGN PATENT DOCUMENTS

WO 2013/179095 A1 12/2013

OTHER PUBLICATIONS

Pham; "Towards Quality of Service for Long-range IoT in Unlicensed Radio Spectrum," 2016 Wireless Days (WD); IEEE; Mar. 23, 2016; pp. 1-3; XP032896993.

(Continued)

*Primary Examiner* — Mohammad S Anwar
(74) *Attorney, Agent, or Firm* — Oliff PLC; R. Brian Drozd (57) ABSTRACT

A method for managing the allocation, by a server of a wide area communication network, of a first list of carrier frequencies that can be used by an electronic device for sending messages, the method including determining a second list of carrier frequencies, receiving a first message from the electronic device via a first carrier frequency not included in the second list, determining the value of a quality parameter associated with the first message received, when this value exceeds the value of a first threshold; determining a first sub-list of the second list, including at least one second carrier frequency not included in the first list, determining a second sub-list of the first list, including at least a third frequency not included in the second list, and sending to the electronic device a second message to replace the carrier (Continued)

frequencies of the second sub-list with those of the first sub-list.

11 Claims, 3 Drawing Sheets

(56) References Cited

U.S. PATENT DOCUMENTS

| | | | |
|---|---|---|---|
| 2011/0026422 A1* | 2/2011 | Ma | H04W 72/0453 370/252 |
| 2013/0023214 A1 | 1/2013 | Wang et al. | |
| 2015/0133057 A1 | 5/2015 | Yavuz et al. | |

OTHER PUBLICATIONS

May 12, 2017 International Search Report issued in International Patent Application No. PCT/EP2017/057297.

* cited by examiner

METHOD FOR MANAGING ALLOCATION OF CARRIER FREQUENCIES

The present invention relates to the field of wide area communication networks intended particularly for the interconnection of communicating objects. The present invention relates more specifically to a method for managing the allocation by a server of carrier frequencies intended to be used for the sending of messages by electronic devices connected to a wide area communication network.

Various protocols define wide area communication networks intended in particular for the interconnection of communicating objects. One of these protocols is defined by the "LoRa™ Alliance" (Long Range Alliance) and bears the name "LoRaWAN™" (LoRa Wide Area Network). This protocol is for example described in the document "LoRaWAN™ Specification v1.0" published in January 2015. In this protocol, the allocation of the carrier frequencies that an electronic device, such as a connected object, uses for sending messages can be defined by an operator of the wide area communication network. The operation of allocating carrier frequencies is typically performed by a server included in the wide area communication network, the server allocating a list of carrier frequencies to each electronic device. Such a server is referred to as the control server. The electronic device can then choose a carrier frequency from the carrier frequencies in this list in order to send a message. In order to avoid an electronic device then monopolising the bandwidth available for it alone, a protection mechanism has been defined. Thus, the carrier frequencies being grouped together in various sub-bands, for each electronic device a so-called "DutyCycle" parameter is possibly associated with each of the sub-bands. An electronic device for which a "DutyCycle" has been fixed for a given sub-band must then comply with this criterion for sendings of messages using a carrier frequency included in said sub-band. Thus, for a given sub-band, and for an electronic device, this electronic device must comply with a maximum duty cycle in message transmission or sending. In other words, after each sending of a message on a carrier frequency included in a sub-band "i", the electronic device cannot then use any carrier frequency included in this sub-band "i" for sending a new message during a period $T_{off(i)}$, with:

$$T_{off}(i)=(\text{TimeOnAir}/\text{DutyCycle}(i))-\text{TimeOnAir},$$

$T_{off}(i)$, corresponding to the period during which the electronic device can no longer use any of the carrier frequencies included in the sub-band "i" after the sending of a message on one of the carrier frequencies included in the sub-band "i", TimeOnAir corresponds to a period of sending of the message on the carrier frequency or, in other words, the duration of occupation of the carrier frequency for the sending of the message, DutyCycle(i) corresponds to a value of DutyCycle for the sub-band "i", the DutyCycle being expressed as a percentage, It should be noted that the TimeOnAir duration corresponds ultimately to the DutyCycle(i) percentage of Toff(i), Thus an electronic device that has just sent a message for a period of 0.2 seconds (TimeOnAir=0.2 seconds) on a carrier frequency of a sub-band "i" associated with a Duty-Cycle of "1%" (DutyCycle(i)=0.01) can no longer send on any of the carrier frequencies of this same sub-band "i" for 19.8 seconds ($T_{off}(i)$=19.8 seconds).

For an electronic device, each frequency sub-band has, or not, a different associated DutyCycle value. The parameter DutyCycle is therefore a parameter making it possible to prevent an electronic device sending messages too frequently, which makes it possible to prevent congestion of the wide area communication network. Thus an electronic device that has just sent a message must comply with a silence time, which enables the other electronic devices using carrier frequencies in the same sub-band also to send messages without risking any interference or collision of the messages sent.

A control server of a wide area communication network, used for allocating carrier frequencies to electronic devices connected to said network, can also allocate DutyCycle values to be complied with for each sub-band corresponding to the carrier frequencies allocated.

However, imposing a DutyCycle value to be complied for sending messages on an electronic device may prevent it from complying with any applicative constraints. This is because the delay to be complied with between the sending of two messages may then become too great for complying with the requirement of an application of an electronic device that would need to send messages more quickly.

It should also be noted that the "LoRaWAN™ Specification v1.0" provides a command "DutyCycleReq" for fixing a maximum DutyCycle value for all the sub-bands used by an electronic device. Thus the maximum value of the DutyCycle for each sub-band will be limited, and the electronic device will not be able to use all the carrier frequencies of the various sub-bands, potentially associated with a larger DutCycle value, at their full potential.

Finally, the command for allocating a DutyCycle value to a sub-band for an electronic device may not be taken into account by this electronic device. The reasons for this may be many, whether the electronic device comprises an application bug or whether the electronic device knowingly refuses the command, in order for example to comply with an applicative constraint.

For all these reasons, it is desirable to overcome these drawbacks of the prior art.

The invention relates to a method for managing the allocation, by a server of a wide area communication network, of a first list of carrier frequencies that can be used by an electronic device connected to said network for sending messages, the server receiving said messages, the method being executed by the server. The method comprises the steps of determining a second list of carrier frequencies, this list corresponding to a list of so-called verbal carrier frequencies, receiving a first message coming from the electronic device, the first message having been sent on a first carrier frequency that is not included in the second list, determining the value of a quality parameter associated with the first message received, and, when the value of the quality parameter exceeds the value of a first threshold: determining a first sub-list of the second list, comprising at least one second carrier frequency, the second carrier frequency not being included in the first list, determining a second sub-list of the first list, comprising at least one third frequency, the third carrier frequency not being included in the second list, the first sub-list and the second sub-list comprising the same number of carrier frequencies, and sending to the electronic device a second message comprising at least one command, the command making it possible to replace the carrier frequencies of the second sub-list with the carrier frequencies of the first sub-list.

Advantageously, the method makes it possible to define, among all the carrier frequencies that can be used by the wide area communication network, a second list of carrier frequencies, referred to as "verbal" or "dustbin" carrier frequencies, for which compliance with a quality parameter is not required. The so-called control server, when it detects that an electronic device is not complying with a quality parameter when it is sending messages on a carrier frequency not belonging to the second list of "verbal" carrier frequencies, can then switch the carrier frequencies used by the electronic device without complying with a quality parameter to "verbal" carrier frequencies. Thus the "non-verbal" carrier frequencies are preserved, the electronic devices not complying with a quality parameter, for example a DutyCycle, being allocated "verbal" carrier frequencies in place of the "non-verbal" carrier frequencies. The method makes it possible to ensure compliance with the quality parameters on the "non-verbal" carrier frequencies, by, in the first list of carrier frequencies that can be used by an electronic device not complying with a quality parameter, replacing "non-verbal" frequencies with "verbal" frequencies.

According to a complementary embodiment of the invention, determining the value of a quality parameter associated with the first message received comprises the steps of: determining a time elapsed between the reception of the first message and the reception of a preceding message, and, when the time elapsed is greater than a predetermined time, incrementing a first counter representing the number of exceedings of the second threshold, the quality parameter corresponding to a ratio between the value of the first counter and a second counter corresponding to a number of messages received by the server coming from the electronic device via a carrier frequency not included in the second list.

Advantageously, the quality parameter may correspond to a time elapsed between the reception of two messages, the predetermined time corresponding for example to a minimum time to be complied with. A ratio is determined between the number of messages not complying with the minimum time and the total number of messages received by the server coming from the electronic device via a "non-verbal" carrier frequency. Corrective action is taken only if the ratio is above a threshold. Thus a certain tolerance is permitted for any isolated non-compliances with the quality parameter.

According to a complementary embodiment of the invention, the predetermined time is determined according to the time taken to send the previous message and a predetermined value associated with the first carrier frequency.

Advantageously, the predetermined value corresponds to a value of a $T_{off}(i)$ of a DutyCycle.

According to a complementary embodiment of the invention, the step of determining the value of the quality parameter is performed only if the first counter or the second counter is above a second threshold.

Advantageously, the method allows a certain tolerance for any non-compliances with the quality parameter by the electronic device by triggering an action of updating the first list only after the detection of a predetermined number of exceedings of the predetermined period.

According to a complementary embodiment of the invention, the wide area communication network is of the LoRaWan type, the first carrier frequency is included in a sub-band, the predetermined period is determined according to a value of a DutyCycle parameter associated with the sub-band, the second counter corresponds to a number of messages received by the server coming from the electronic device via a carrier frequency not included in the second list and included in the same sub-band as the first carrier frequency, and the third frequency is also included in the sub-band.

Advantageously, the method applies in a context of a wide area communication network of the LoRaWAN type. The quality parameter associated with the first message received corresponds then to the parameter $T_{off}(i)$.

According to a complementary embodiment of the invention, the second carrier frequency is chosen equal to a predetermined value when all the carrier frequencies in the second list are included in the first list.

Advantageously, a choice of a predetermined value makes it possible to overcome the lack of carrier frequency available.

The invention also relates to a server of a wide area communication network, the server comprising a first processor, the first processor being suitable for allocating a first list of carrier frequencies that can be used by an electronic device connected to said network for sending messages, determining a second list of carrier frequencies, this list corresponding to a list of so-called verbal carrier frequencies, receiving a first message coming from the electronic device, the first message having been sent on a first carrier frequency that is not included in the second list, determining the value of a quality parameter associated with the first message received, and, when the value of the quality parameter exceeds the value of a first threshold: determining a first sub-list of the second list, comprising at least one second carrier frequency, the second carrier frequency not being included in the first list, determining a second sub-list of the first list, comprising at least one third frequency, the third frequency not being included in the second list, the first sub-list and the second sub-list comprising the same number of carrier frequencies, sending to the electronic device a second message comprising at least one command, the command making it possible to replace the carrier frequencies of the second sub-list with the carrier frequencies of the first sub-list.

The invention also relates to a system comprising at least one electronic device and a server, both connected by a wide area communication network, the server comprising a first processor, the first processor being suitable for allocating a first list of carrier frequencies that can be used by an electronic device connected to the network for sending messages, determining a second list of carrier frequencies, this list corresponding to a list of so-called verbal carrier frequencies, receiving a first message coming from the electronic device, the first message having been sent on a first carrier frequency that is not included in the second list, determining the value of a quality parameter associated with a first message received, and, when the value of the quality parameter exceeds the value of a first threshold: determining a first sub-list of the second list, comprising at least one second carrier frequency, the second carrier frequency not being included in the first list, determining a second sub-list of the first list, comprising at least one third frequency, the third frequency not being included in the second list, the first sub-list and the second list comprising the same number of carrier frequencies, and sending to the electronic device a second message comprising at least one command, the command making it possible to replace the carrier frequencies of the second sub-list with the carrier frequencies of the first sub-list, the electronic device comprising a second processor, the second processor being suitable for receiving the first list of carrier frequencies that can be used for sending messages on the wide area communication network, sending messages on one of the carrier frequencies of the first list, receiving the second message, and updating the first list according to at least the command received.

The present invention also relates to a computer program comprising instructions for the implementation, by a processor, of the method for managing the allocation of carrier frequencies according to the invention, when said computer program is executed by said processor.

The present invention also relates to storage means storing said computer program.

The features of the invention mentioned above, as well as others, will emerge more clearly from a reading of the following description of an example embodiment, said description being given in relation to the accompanying drawings, among which.

Figure 1:
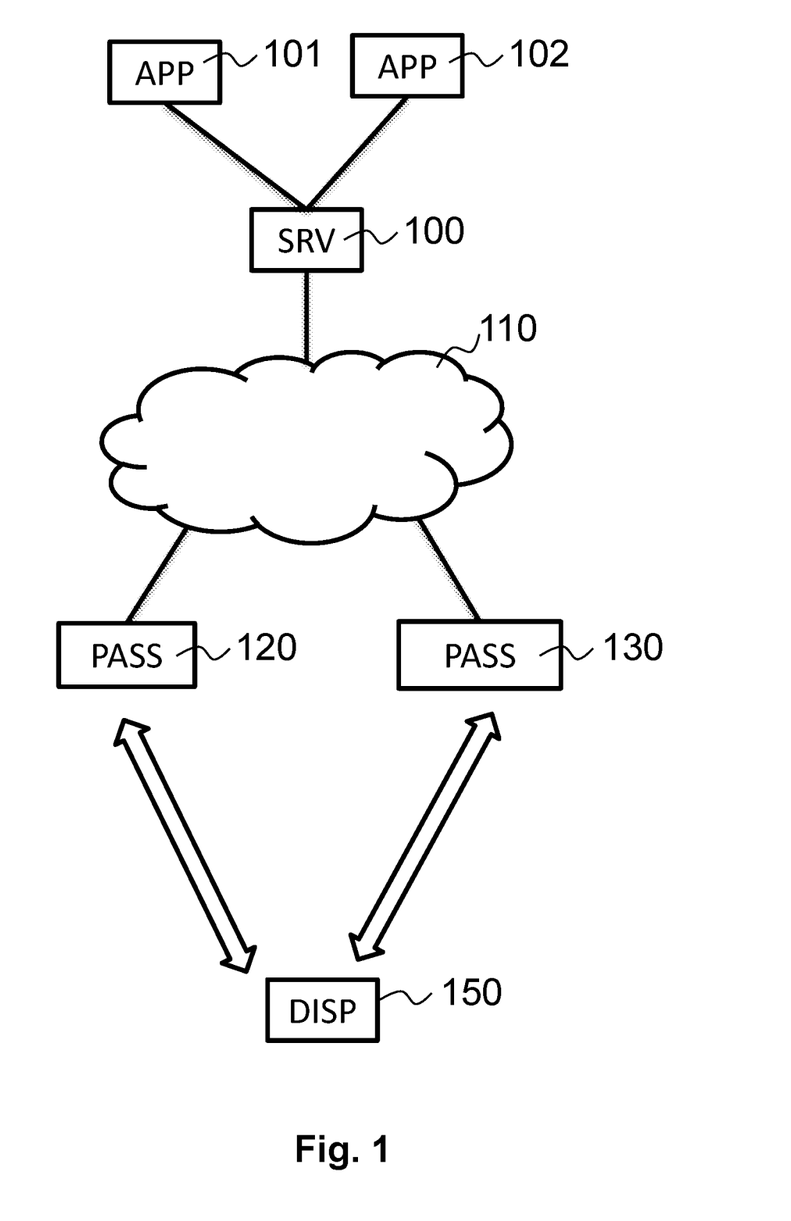
FIG. 1 illustrates schematically the architecture of a wide area communication network used in particular for connecting communicating objects.

FIG. 1 illustrates schematically the architecture of a wide area communication network used in particular for connecting communicating objects. A communicating object, or electronic device, DISP 150 can connect to the wide area communication network via at least one gateway PASS 120 or 130. The gateways PASS 120 and 130 are connected via a communication network, for example of the internet type, to a server SRV 100, referred to as the control server. According to the technologies established, the control server is referred to as a LNS server (standing for "L2TP Network Server") since a tunnel can be established between the electronic device 150 and the server SRV 100, the tunnel using a Layer 2 Tunneling Protocol—L2TP. Various application servers APP 101 or 102 may be connected to the server SRV 100.

The electronic device DISP 150 communicates with a gateway PASS 120 or 130 via radio-frequency technology. As seen previously, the allocation of the carrier frequency bands that can be used by the electronic device DISP 150 can be done by the server SRV 100. The carrier frequencies allocated to an electronic device DISP 150 for communicating, that is to say sending messages to a gateway, are chosen from a list of available carrier frequencies allocated for the operation of the wide area communication network. The allocation of the carrier frequencies is part of a strategy chosen by an operator of the wide area communication network.

According to the present invention, the operator of a wide area communication network distinguishes, among the carrier frequencies available, between so-called "verbal" carrier frequencies and so-called "non-verbal" carrier frequencies. The advantage of such a choice is then being able to preferentially allocate the "verbal" carrier frequencies to electronic devices that do not comply with certain quality criteria for sending their messages, and thus preserving the non-verbal carrier frequencies. This management of the allocation of the carrier frequencies is dynamic, making it possible to detect and react when an electronic device is no longer complying with the sending quality criteria for its messages. It should be noted that the choice, as well as the number, of the so-called "verbal" carrier frequencies forms part of a strategy of the operator of the wide area communication network.

Figure 2:
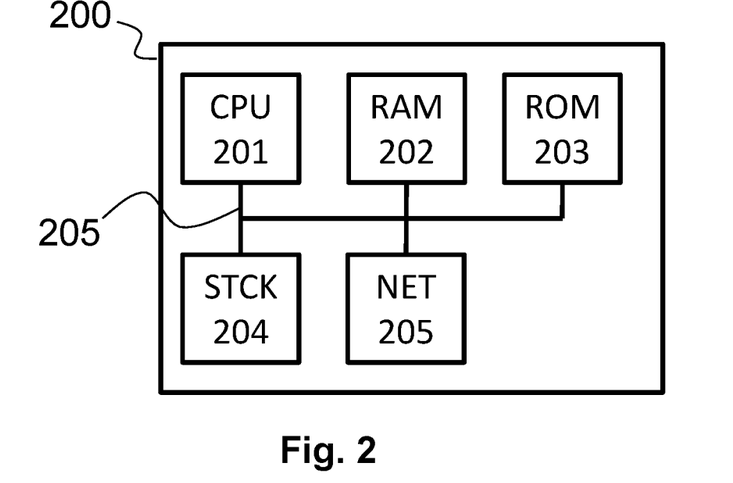
FIG. 2 illustrates schematically the architecture of a server suitable for implementing the method according to an embodiment of the invention.

FIG. 2 illustrates schematically the architecture of a server suitable for implementing the method according to an embodiment of the invention. The server 200 is the server 100 in FIG. 1. The server 200 comprises, connected by a communication bus 205: a processor or CPU (central processing unit) 201; a random access memory (RAM) 202; a read-only memory (ROM) 203; a storage unit or a storage medium reader, such as an SD (secure digital) card reader or a hard disk drive (HDD) 204 and at least one network interface NET 205 enabling the server 200 to access a communication network.

The processor 201 is capable of executing instructions loaded into the RAM 202 from the ROM 203, from the storage unit STCK 204 or from a communication network via the network interface NET 205. When the server 200 is powered up, the processor 201 is capable of reading instructions from the RAM 202 and executing them. These instructions form a computer program enabling the implementation or execution, by the processor 201, of all or some of the methods and steps described in the present document.

Thus all or some of the methods and steps described in the present document can be implemented in software form by the execution of a set of instructions by a programmable machine, such as a DSP (digital signal processor) or a microcontroller. All or some of the modules, methods and steps described below can also be implemented in hardware form by a machine or a dedicated component, such as an FPGA (field-programmable gate array) or an ASIC (application-specific integrated circuit).

Figure 3:
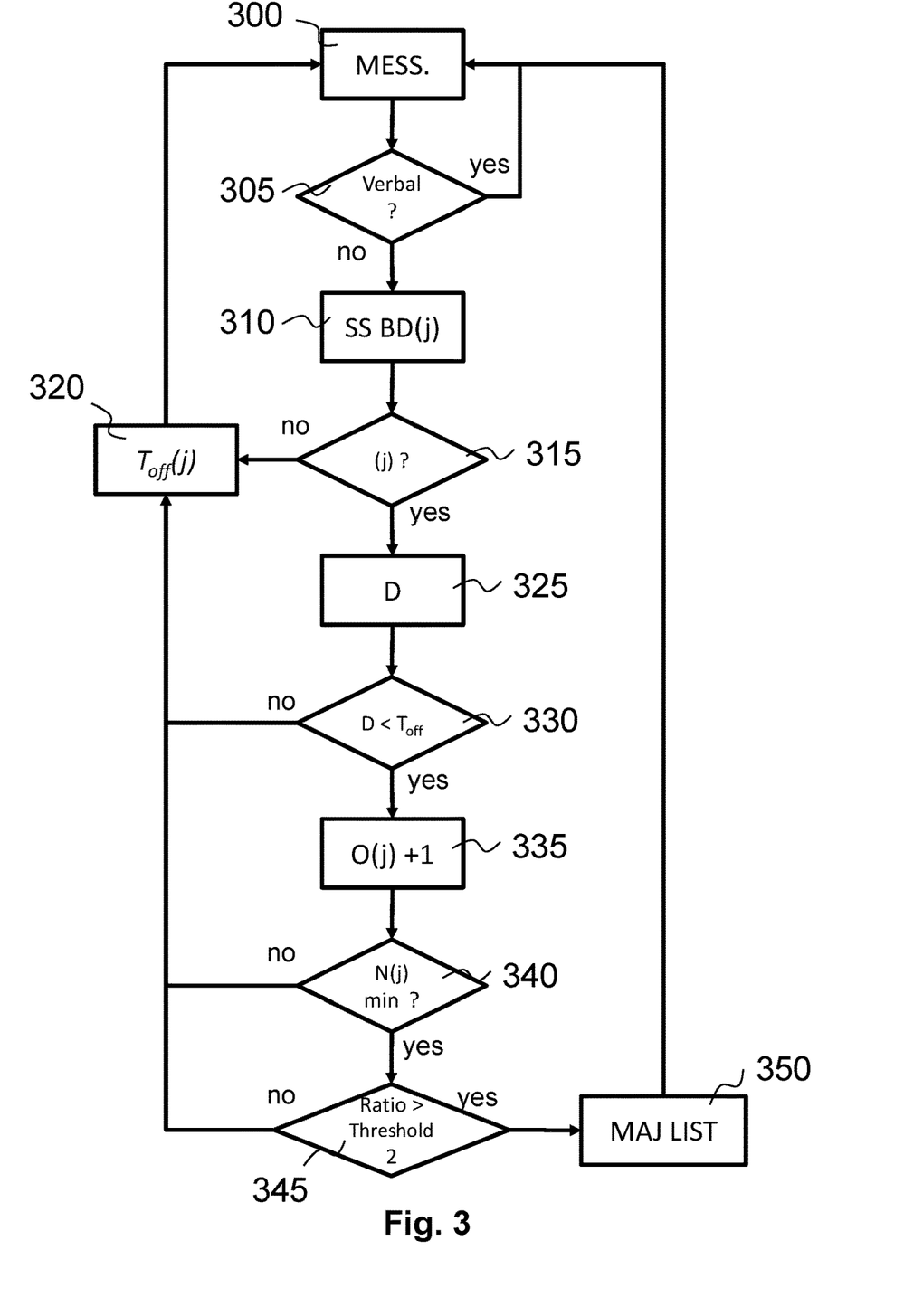
FIG. 3 illustrates schematically a method for managing the allocation, by a server of a wide area communication network, of a list of carrier frequencies that can be used by an electronic device connected to said network for sending messages according to an embodiment of the invention.

FIG. 3 illustrates schematically a method for managing the allocation, by a server of a wide area communication network, of a list of carrier frequencies that can be used by an electronic device connected to said network for sending messages according to an embodiment of the invention. Said server is similar to the server 200 illustrated in FIG. 2, that is to say a server SRV 100 illustrated in FIG. 1. The wide area communication network and the electronic device are those illustrated in FIG. 1, the electronic device being the communicating object DISP 150.

The method described below is executed after a first step of allocation of carrier frequencies, according to a known method, to the electronic device DISP 150, the allocation of carrier frequencies leads to the allocation of a first list of carrier frequencies for the electronic device DISP 150. Said electronic device can therefore choose one of the carrier frequencies of the first list for sending a message. The server SRV 100 manages in particular the allocation of the first list of carrier frequencies to the electronic device DISP 150.

A second list of carrier frequencies is defined by, for example, an operator of the wide area communication network. The second list corresponds to the so-called "verbal" carrier frequencies. Consequently the carrier frequencies available for being used by the wide area communication network but not included in this second list are said to be "non-verbal". The objective of the method is to ensure that electronic devices that do not comply with quality criteria preferentially send their messages on so-called "verbal" carrier frequencies, in order to preserve a quality of service for the so-called "non-verbal" carrier frequencies.

The first list and the second list are recorded in a memory accessible to the server SRV 100, typically in the storage unit STCK 204 of the server SRV 100.

In a step 300, once the carrier frequencies have been allocated to the electronic device DISP 150, the server SRV 100 awaits reception of a message coming from the electronic device DISP 150.

In a subsequent step 305, if a message is received, then the server SRV 100 determines whether said message had been sent by the electronic device DISP 150 via a first carrier frequency included in the second list of so-called "verbal" carrier frequencies.

This is because, when the electronic device DISP 150 sends a message, the latter may be received by one or more gateways PASS 120 or 130. One or more gateways PASS 120 or 130 next transmit the message received to the server SRV 100, the message then being accompanied by information such as the carrier frequency on which the message was received, a time marking ("timestamp"), corresponding to the moment of reception of the message, or any other parameter relating to the reception of the message by the gateway PASS transmitting the message. The server SRV 100 therefore receives the message sent by the electronic device DISP 150, possibly in several copies since it may have been transmitted by various gateways PASS, accompanied by information on the first carrier frequency used by the electronic device DISP 100 for sending the message.

If the electronic device DISP 150 sent the message on a first carrier frequency included in the second list, that is to say a so-called "verbal" carrier frequency, then the server SRV 100 here stops the processing for this message and returns to step 301 to await the next message.

If the electronic device DISP 150 sent the message on a first carrier frequency not included in the second list, that is to say a so-called "non-verbal" carrier frequency, then the server SRV 100 passes to a step 310.

In other words, if the server SRV 100 receives a message coming from the electronic device DISP 150, the message having been sent on a first carrier frequency that is not included in the second list of so-called "verbal" carrier frequencies, then the server SRV 100 passes to step 310.

In the subsequent step 310, the server SRV 100 determines a sub-band "j" to which the first carrier frequency used by the electronic device for sending the message belongs. The information relating to a sub-band in which a carrier frequency is included is defined by the operator of the wide area communication network, possibly according to a standard, and recorded in a memory accessible to the server SRV 100, possibly the storage unit STCK 204.

During this step 310, a counter "N(j)" associated with the sub-band "j" is incremented. This counter "N(j)" makes it possible to count the number of messages received by the server SRV 100, messages sent by the electronic device DISP 150 via a so-called "non-verbal" carrier frequency of the sub-band "j".

The server SRV 100 also determines at least one quality parameter to be complied with associated with the sub-band "j". The quality parameter may correspond to any defined constraint with which the electronic device DISP 150 must comply with when it sends a message on any carrier frequency of the sub-band "j". Possibly, the quality parameter corresponds to a DutyCycle, that is to say a minimum period that must elapse between the sendings of two consecutive messages on any carrier frequency of the sub-band "j" as explained previously. For example, the server may determine that the "Duty Cycle(j) to be complied with for the sub-band "j" determined is one percent (1%).

In a subsequent step 315, the server SRV 100 determines whether it has, in a previous step, received a previous message sent on one of the carrier frequencies of the sub-band "j".

If the server has not previously received a message, then it is not possible to determine the value of the quality parameter corresponding to the DutyCycle(j) to be complied with since this is defined in particular by the time of sending the previous message, as seen previously. In this case, the server SRV 100 passes to step 320.

However, according to an alternative embodiment of the invention, if no message sent on one of the carrier frequencies of the sub-band "j" has previously been received, then the server SRV 100 determines a notional value of the period $T_{off}(j)$ to be complied with corresponding to DutyCycle(j), choosing it for example equal to the maximum period that can be measured by the server SRV 100 (this value then depends on the method of coding a period by the server SRV 100). In this alternative case, the server SRV 100 next passes to step 325.

In a step 320, the server SRV 100 determines the duration of sending of the message received ("TimeOnAir"). This duration can be determined from the length of the message received. This duration may be transmitted by a gateway PASS 120 or 130 that transmitted the message to the server SRV 100, the duration of sending being information determined by the gateway. This duration of sending may also be determined from information included in the message itself, the electronic device DISP 150 possibly being able to encode the duration of sending of the message in the message itself.

With the duration of sending thus determined, and with the value of the DutyCycle(j), the server SRV 100 determines the value $T_{off}(j)$ corresponding to the time that the electronic device DISP 150 must normally wait before sending another message via one of the carrier frequencies of the sub-band "j". In other words, the server SRV 100 determines the value of the quality parameter to be complied with for the next message received via one of the carrier frequencies of the sub-band "j"; the next message normally not having to be sent before the time $T_{off}(j)$ has elapsed. The time $T_{off}(j)$ is typically counted as from the moment of reception of the previous message ("timestamp" associated with the previous message).

Thus, for a message received, during step 320, the server SRV 100 determines:
  the moment of reception of this message received ("timestamp"),
  the time that must elapse before the sending of the next message, according to the DutyCycle(j) and the time of sending of this message received ("TimeOnAir").

These parameters are recorded in a memory of the server SRV 100 in association with the sub-band "j", for example in the storage unit STCK 204.

In the case where a message has previously been sent by the electronic device DISP 150 via one of the carrier frequencies of the sub-band "j", then values of the previous parameters are recorded in a memory of the server SRV 100 in association with the sub-band "j". The server SRV 100 then passes to a step 325.

In step 325, the server SRV 100 determines the time "D" that has elapsed between the reception of the message received and the reception of the previous message sent via one of the carrier frequencies of the sub-band "j". To determine this value of "D", the server SRV 100 calculates the difference between the timestamp associated with the reception of the message received and the timestamp of a previous message recorded in association with the sub-band "j" in a memory of the server SRV 100, for example the storage unit STCK 204. The latter timestamp was recorded during a previous step 320.

In a subsequent step 330, the server SRV 100 determines whether or not the elapsed time "D" determined during the previous step 325 is above a first threshold. This first threshold is typically chosen as being the value $T_{off}(j)$. In order to take account of a possible lack of precision or phase difference in the clocks of the equipment (server SRV 100, gateway PASS and electronic device DISP 150) and to offer a certain tolerance, the value of the first threshold may be chosen as being equal to the value of "$T_{off}(j)$" reduced by certain margin (for example a few milliseconds less than $T_{off}(j)$) or as equal to a percentage of the value of $T_{off}(j)$ (for example 90% of $T_{off}(j)$)).

If the elapsed time "D" is above the first threshold, then the DutyCycle(j) is considered to be complied with and the server SRV 100 passes to step 320 in order to update the values of $T_{off}(j)$ and the timestamping of the message received for the next message.

If the elapsed time "D" is below the first threshold, then the DutyCycle(j) is not complied with for this received message. The received message should normally not have been sent by the electronic device DISP 100 so soon after the sending of the previous message, as a period greater than the first threshold (which is of the same order of magnitude as $T_{off}(j)$)) should normally have elapsed. The server SRV 100 then passes to a step 335.

In step 335, the server SRV 100 increments a counter "O(j)" associated with the sub-band "j". This counter "O(j)" corresponds to the number of messages for which the associated elapsed time "D" has exceeded the first threshold. In other words, this counter "O(j)" represents the number of messages that have not complied with a quality parameter (for example a sending cycle DutyCycle(j)) for the sub-band "j".

In a subsequent step 340, the server SRV 100 determines how many messages have been received coming from the electronic device DISP 150 via one of the so-called "non-verbal" carrier frequencies of the sub-band "j". In other words, the server SRV 100 finds the value of the counter "N(j)" incremented during step 310. If the server considers that this number "N(j)" is not sufficiently high to be representative (that is to say, if the number of messages is below a second threshold), the server SRV 100 passes to step 320.

Alternatively, during step 340, the server SRV 100 considers the value of the counter "O(j)" determined during step 335 rather than the number of messages "N(j)" received from the electronic device DISP 150 via one of the so-called "non-verbal" carrier frequencies of the sub-band "j". According to another embodiment, the two values are each compared with a different threshold.

The advantage of step 340 is to ensure that the server SRV 100 performs corrective actions vis-à-vis the electronic device (see subsequent step 350) only if a significant number of messages have been received and/or received and identified as not complying with a quality parameter. Step 340 particularly makes it possible to ensure that the ratio determined during the subsequent step 345 is significant since it relates to sufficiently large values.

In the subsequent step 345, the server SRV 100 determines a ratio between the counter "O(j)" determined during step 335 and the number of messages received from the electronic device DISP 150 via one of the so-called "non-verbal" carrier frequencies of the sub-band "j" (counter "N(j)"). This ratio is therefore a quality parameter associated with the message received, this quality parameter possibly being determined for each message received. In other words, the server SRV 100 determines the value of a quality parameter associated with the message received.

If this ratio "O(j)/N(j)" is below the third threshold, then the server SRV 100 passes to step 320. This case corresponds to a situation where it is considered that the number of messages sent not complying with the DutyCycle(j) is not sufficiently high compared with the number of messages "N(j)" sent by the electronic device DISP 150. No corrective action is taken.

On the other hand, if the ratio "O(j)/N(j)" is above the third threshold, then the number of messages "O(j)" not complying with the DutyCycle(j) is sufficiently high compared with N(j). In this case, the electronic device DISP 150 is considered to be a disturbance since it is sending on so-called non-verbal carrier frequencies without complying with the DutyCycle(j). The server SRV 100 then passes to a step 350.

In a step 350, the server SRV 350 determines:
  a first sub-list of the second list of so-called "verbal" carrier frequencies, comprising at least one second carrier frequency, the second carrier frequency being included in the first list of carrier frequencies allocated to the electronic device DISP 150,
  a second sub-list of the first list, comprising at least one third frequency, the third carrier frequency not being included in the second list,
  the first sub-list and the second sub-list comprising the same number of carrier frequencies.

In other words, the server SRV 100 determines two sub-lists comprising the same number of elements, with:
  a first sub-list of so-called "verbal" carrier frequencies not used by the electronic device DISP 150, and
  a second sub-list of so-called "non-verbal" carrier frequencies used by the electronic device.

The server SRV 100 next sends to the electronic device DISP 150 a second message comprising at least one command, the command making it possible to replace the carrier frequencies of the second sub-list with the carrier frequencies of the first sub-list. In other words, the server sends a command to the electronic device DISP 150 in order to replace so-called "non-verbal" carrier frequencies with so-called "verbal" carrier frequencies.

Thus the electronic device DISP 150 not correctly complying with the quality of parameters has a first list of carrier frequencies comprising a larger percentage of so-called "verbal" carrier frequencies, carrier frequencies for which the operator of the communication network accepts a lower compliance with the quality constraints. Conversely, the operator thus guarantees that the disturbing electronic devices send less on the so-called "non-verbal" carrier frequencies, guaranteeing better compliance with the quality constraints on these carrier frequencies.

The server SRV 100 can during this step 350 replace a predetermined percentage of so-called "non-verbal" carrier frequencies of the sub-band "j" with so-called "verbal" carrier frequencies.

If the server SRV 100 does not have sufficient so-called "verbal" carrier frequencies to form the first sub-list, then the server SRV 100 sends commands in order to mask the remaining so-called non-verbal frequencies. In other words, if the server SRV 100 must replace "n" so-called "non-verbal" carrier frequencies of the first list with "verbal" carrier frequencies but there remain no more than "m" (with "m"<"n") so-called "verbal" carrier frequencies available (i.e. the others are already all included in the first list), then the server SRV 100:
  replaces "m" carrier frequencies of the first list with the "m" so-called "verbal" carrier frequencies,
  masks the "n–m" remaining carrier frequencies.

Replacement of the carrier frequencies in the first list can be done by means of the command "NewChannelReq" as defined in the document "LoRaWAN™ Specification v1.0". Thus the masking of a carrier frequency used by an given electronic device is done using a "zero" value for a field "Freq" of the command "NewChannelReq", with a field "chIndex" corresponding to said carrier frequency to be masked.

During step 350, the server SRV 100 resets the counters "N(j)" and "O(j)" to zero before going to step 300 again.

The method described can in particular be implemented by a server LNS of a wide area communication network of the LoRaWAN type.

According to a complementary embodiment of the invention, the server SRV 100 does not perform step 340, then passing from step 335 to step 345. The method is more reactive, but gives rise to the sending of a greater number of command messages (corresponding to the commands sent during step 350) to the various electronic devices.

According to an alternative embodiment of the invention, the server SRV 100 passes directly to step 350 after step 330 if the time "D" is below the first threshold. In this embodiment, the server SRV 100 takes a corrective action (step 350) as from the first non-compliance with a quality parameter (DutyCycle(j)). The method is then much more reactive, but may give rise to the sending a significant number of command messages (corresponding to the command sent during step 350) to the various electronic devices.

It should be noted that, if a plurality of electronic devices similar to the electronic device DISP 150 are connected to the wide area communication network, the server will perform the same number of iterations of the method in parallel as there are electronic devices connected.

The invention claimed is:

1. A method for managing the allocation, by a server of a communication network, of a first list of carrier frequencies that can be used by an electronic device connected to said network for sending messages, the server receiving said messages, the method being executed by the server, the method comprising the steps of:
  determining a second list of carrier frequencies, this list corresponding to a list of predetermined frequencies,
  receiving a first message coming from the electronic device, the first message having been sent on a first carrier frequency that is not included in the second list,
  determining the value of a quality parameter associated with the first message received,
  when the value of a second quality parameter, calculated according to the first quality parameter, exceeds the value of a first threshold:
    determining a first sub-list of the second list, comprising at least one second carrier frequency, the second carrier frequency not being included in the first list,
    determining a second sub-list of the first list, comprising at least one third frequency, the third carrier frequency not being included in the second list,
    the first sub-list and the second sub-list comprising a same number of carrier frequencies,
  sending to the electronic device a second message comprising at least one command, the command making it possible to replace the carrier frequencies of the second sub-list with the carrier frequencies of the first sub-list.

2. The method according to claim 1, determining the value of the second quality parameter associated with the first message received, comprising the steps of:
  determining as the value of the first quality parameter a time elapsed between the reception of the first message and the reception of a preceding message,
  when the time elapsed is greater than a predetermined time, incrementing a first counter representing the number of exceedings of the second threshold,
  the second quality parameter corresponding to a ratio between the value of the first counter and a second counter corresponding to a number of messages received by the server coming from the electronic device via a carrier frequency not included in the second list.

3. The method according to claim 2, the predetermined time being determined according to the time taken to send the previous message and a predetermined value associated with the first carrier frequency.

4. The method according to claim 3, the step of determining the value of the quality parameter being performed only if the first counter or the second counter is above a second threshold.

5. The method according to claim 2, the communication network being of the LoRaWan type, the first carrier frequency being included in a sub-band, the predetermined period being determined according to a value of a Duty-Cycle parameter associated with the sub-band, the second counter corresponding to a number of messages received by the server coming from the electronic device via a carrier frequency:
  not included in the second list and
  included in the same sub-band as the first carrier frequency,
  and the third frequency also being included in the sub-band.

6. The method according to claim 1, the second carrier frequency being chosen equal to a predetermined value when all the carrier frequencies in the second list are included in the first list.

7. A computer program product embodiment in a non-transitory storage means the computer program product comprising instructions for the implementation, by the first processor, of the method for managing the allocation of a first list of carrier frequencies that can be used by an electronic device connected to a network for sending messages according to claim 1, when said computer program is executed by said processor.

8. A non-transitory storage means adapted to store a computer program according to claim 7.

9. A server of a communication network, the server comprising a first processor, the first processor being suitable for:
  allocating a first list of carrier frequencies that can be used by an electronic device connected to said network for sending messages,
  determining a second list of carrier frequencies, this list corresponding to a list of predetermined carrier frequencies,
  receiving a first message coming from the electronic device, the first message having been sent on a first carrier frequency that is not included in the second list,
  determining the value of a first quality parameter associated with the first message received, when the value of a second quality parameter, calculated according to the first quality parameter, exceeds the value of a first threshold:
  determining a first sub-list of the second list, comprising at least one second carrier frequency, the second carrier frequency not being included in the first list,
  determining a second sub-list of the first list, comprising at least one third frequency, the third frequency not being included in the second list,
  the first sub-list and the second sub-list comprising the same number of carrier frequencies,
sending to the electronic device a second message comprising at least one command, the command making it possible to replace the carrier frequencies of the second sub-list with the carrier frequencies of the first sub-list.

10. A system comprising a server according to claim 9 and at least one electronic device, the server and at least the electronic device being connected to a communication network, the at least one electronic device being suitable for being connected to a communication network, the at least one electronic device comprising a processor, the processor being suitable for:
  receiving a first list of carrier frequencies that can be used for sending messages on the communication network,
  sending messages on one of the carrier frequencies of the first list,
  receiving a second message, the second message comprising at least one command, the command making it possible to replace the carrier frequencies of a second sub-list with the carrier frequencies of a first sub-list, and
  updating the first list according to at least the command received.

11. An electronic device suitable for being connected to a communication network, the electronic device comprising a processor, the processor being suitable for:
  receiving a first list of carrier frequencies that can be used for sending messages on the communication network,
  sending messages on one of the carrier frequencies of the first list,
  receiving a second message, the second message comprising at least one command, the command making it possible to replace the carrier frequencies of a second sub-list with the carrier frequencies of a first sub-list, and
  updating the first list according to at least the command received.

\* \* \* \* \*